US006835934B2

(12) United States Patent
Nemeth et al.

(10) Patent No.: US 6,835,934 B2
(45) Date of Patent: Dec. 28, 2004

(54) METHOD OF DETERMINING A CHARACTERISTIC OF A SECURITY DOCUMENT, SUCH AS A BANKNOTE

(75) Inventors: Joshua Robert Nemeth, Heathmont (AU); Bruce Alfred Hardwick, Wandong (AU)

(73) Assignee: Note Printing Australia Limited, Craigieburn (AU)

( * ) Notice: Subject to any disclaimer, the term of this patent is extended or adjusted under 35 U.S.C. 154(b) by 41 days.

(21) Appl. No.: 10/181,048

(22) PCT Filed: Dec. 29, 2000

(86) PCT No.: PCT/AU00/01608

§ 371 (c)(1),
(2), (4) Date: Oct. 21, 2002

(87) PCT Pub. No.: WO01/50426

PCT Pub. Date: Jul. 12, 2001

(65) Prior Publication Data

US 2003/0038239 A1 Feb. 27, 2003

(30) Foreign Application Priority Data

Dec. 30, 1999 (AU) ........................................... PQ 4929

(51) Int. Cl.[7] ................................................ G01N 21/00

(52) U.S. Cl. .................... 250/341.1; 250/372; 356/432; 324/639

(58) Field of Search .............................. 250/341.1, 372; 356/432; 324/639

(56) References Cited

U.S. PATENT DOCUMENTS 3,728,521 A 4/1973 Borough et al.
4,710,614 A 12/1987 Camus
4,756,557 A 7/1988 Kaule et al.
5,388,862 A * 2/1995 Edwards ...................... 283/82
5,881,196 A 3/1999 Phillips

FOREIGN PATENT DOCUMENTS

| | | | |
|---|---|---|---|
| EP | 0 430 810 | A1 | 6/1991 |
| EP | 0 814 437 | A2 | 12/1997 |
| FR | 2 698 964 | A | 6/1994 |
| GB | 2 250 474 | A | 6/1992 |
| SE | 8501-458 | A | 9/1986 |
| WO | 87/06041 | A | 10/1987 |

OTHER PUBLICATIONS

Coventry, L., "Polymer Banknotes–Australia's Experience." Interpol 9th International Conference on Currency Counterfeiting, Helsinki, Finland [online], Jun. 1997 [retrieved on Feb. 18, 2004]. Retrieved from the Internet: <URL: http://www.rba.gov.au/.* CurrencyNotes/ConferencePapers/cu_6.2.html>.*

* cited by examiner

*Primary Examiner*—Constantine Hannaher
(74) *Attorney, Agent, or Firm*—Christensen O'Connor Johnson Kindness PLLC

(57) ABSTRACT

A method of determining at least one characteristic of one or more security documents such as banknotes, each security document including a sheet-like substrate of plastics material and opacifying layers applied to opposing faces of the substrate, the method comprising the steps of:(a) projecting radiation from a radiation source into the substrate of each security document for propagation therein, the opacifying layers acting to guide the projecting radiation within the substrate; (b) detecting a radiation emission of the substrate of each security document, the radiation emission resulting from the propagated radiation; and (c) analysing one or more characteristics of the radiation emission.

20 Claims, 4 Drawing Sheets

METHOD OF DETERMINING A CHARACTERISTIC OF A SECURITY DOCUMENT, SUCH AS A BANKNOTE

This is a United States national stage application of International application No. PCT/AU00/01608, filed Dec. 29, 2000, the benefit of the filing date of which is hereby claimed under 35 U.S.C. § 120, which in turn claims the benefit of Australian application No. PQ 4929, filed Dec. 30, 1999, the benefit of the filing date of which is hereby claimed under 35 U.S.C. § 119.

The present invention relates generally to a method for determining at least one characteristic of one or more security documents, and in particular to security documents including a sheet like substrate of plastics material and an opacifying layer, such as ink, applied to opposing faces of the substrate. The invention will be described with particular reference to a banknote, but it is to be understood, however, that the invention is not limited to that application.

Central and commercial banks currently devote significant resources to the handling of banknotes. For example, each time banknotes are returned to the banks, the banknotes are required to be counted, sorted for fitness for use, authenticated and sorted by denomination. Currently, both paper and polymer banknotes are counted by using currency verifying counting and sorting (CVCS) machines in most central banks. These machines are used to test for surface wear on each banknote, to detect the presence of counterfeit notes, to count the banknotes, to sort banknotes fit for future use from those unfit for future use, to bundle and wrap banknotes, as well as to destroy worn banknotes.

Various techniques are used in the CVCS machines for performing these functions. For example, the counting of banknotes is currently performed by mechanical apparatus which unfortunately produce considerable wear on the banknotes and are often are inaccurate. Surface wear on polymer banknotes is detected by scanning the banknotes to detect image fade effects in the printed designs formed in or on the opacifying layer applied to opposing faces of the banknote. Unfortunately, the performance of this technique, and many of the other techniques performed by the CVCS machines, requires the operation of complex and costly equipment, and is inherently inaccurate.

It would therefore be desirable to provide a method of determining at least one characteristic of one or more security documents, such as banknotes, which ameliorates or overcomes one or more disadvantages of the prior art.

The present invention provides a method of determining at least one characteristic of one or more security documents, such as banknotes, each security document including a sheet-like substrate of plastics material and opacifying layers applied to opposing faces of the substrate, the method comprising the steps of:

(a) projecting radiation from a radiation source into the substrate of each security document for propagation therein, the opacifying layers acting to guide the projecting radiation within the substrate;

(b) detecting a radiation emission of the substrate of each security document, the radiation emission resulting from the propagated radiation; and (c) analysing one or more characteristics of the radiation emission.

In one embodiment, step (c) may include detecting the intensity of the radiation emission from said one or more security documents. Alternatively, or additionally, step (c) may include detecting the integrity of the radiation emission from said one or more security documents. The wavelength of the radiation emission may also be analysed in step (c).

The radiation emission may be detected in step (c) across at least part of the width of the security document.

In a further embodiment, the substrate may include a substance or material for modulating the propagated radiation within the substrate of each security document so that the radiation emission creates a machine readable effect, step (c) including detecting that machine readable effect. The radiation emission may include authenticating information which is detected in step (c). Conveniently, each substance or material so used may be denomination specific.

The projected radiation in step (a) may be projected onto an edge of the substrate of each security document.

Similarly, the radiation emission may be detected in step (b) from an edge of each security document. The edge from which the radiation emission is detected may be the same as, or different from, the edge onto which the projected radiation is projected.

In one embodiment of the invention, the opacifying layers only partially cover at least one of the faces of the substrate to leave an uncovered zone on that face, the projected radiation in step (a) being projected onto the uncovered zone.

The substrate may include material that acts to assist in the propagation of the radiation in the substrate. Such material may include fluorescent, phosphorescent, pearlescent or like inks.

One or more of the opacifying layers may be formed from ink. Alternatively, one or more of the opacifying layers may be formed from paper.

The radiation projected in step (a) may include visible light, ultraviolet light, radio waves or infrared light. The radiation projected in step (a) may form part of the visible or non-visible light spectrum.

Several exemplary, but non-limiting, embodiments of the invention will now be described with reference to the accompanying drawings, in which.

Figure 1:
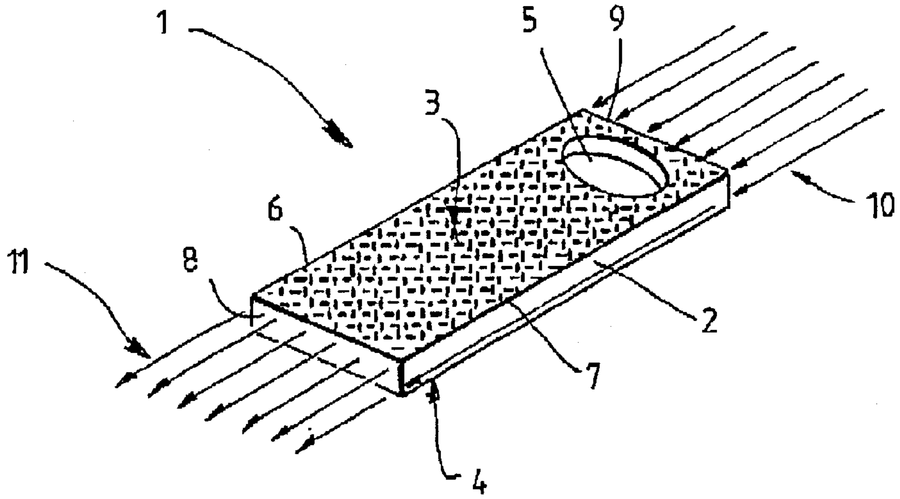
FIG. 1 is a perspective view of a banknote having at least one characteristic to be determined according to a first embodiment of a method according to the present invention.

Referring now to FIG. 1, there is shown a banknote 1 that is substantially rectangular in shape having substantially parallel sides 6 and 7 and substantially parallel ends 8 and 9. The banknote 1 includes a sheet-like substrate of transparent plastics material. The substrate 2 is covered over most of its upper and lower surfaces by opacifying layers 3 and 4. The banknote 1 is conventionally known as a "polymer banknote".

Preferably, the sheet-like substrate 2 is made of flexible material but in security documents other than banknotes, this is not necessarily the case. Similarly, whilst the use of a transparent plastics material in the banknote 1 provides the substrate with a transparent appearance, the term in "transparent" is to be understood in the context of the present specification as enabling the transmission of light or other form of radiation therethrough.

As shown in FIG. 1, the opacifying layers need not be applied over the entire surfaces of the sheet-like substrate 2 to thus leave a transparent portion 5 of the substrate which is at least partially not covered by the opacifying layers. This transparent portion 5 constitutes a "window" in the banknote through which light or other radiation may be transmitted.

The substrate 2 of transparent plastics material is preferably formed from a transparent polymeric material that may be made up of at least one biaxially oriented polymeric film. The substrate may comprise a single layer of film of polymeric material. Alternatively, the substrate may comprise a laminate of two or more layers of transparent biaxially oriented polymeric film.

The opacifying layers 3 and 4 may comprise any one or more of a variety of opacifying inks which can be used in the printing of banknotes or other security documents. For example, the layers of opacifying ink may comprise pigmented coatings comprising a pigment, such as titanium dioxide, dispersable within a suitable binder or carrier of heat activated cross-linkable polymeric material. Alternatively, a substrate of transparent plastics material 2 may be sandwiched between opacifying layers of paper onto which indicia is printed or otherwise applied.

The opacifying layers 3 and 4 form an outer shell which act as a light guide to direct light or other radiation incident on an uncovered portion of the banknote 1 through the inner substrate 2 of the banknote 1 to exit at another uncovered portion of the banknote. As seen in FIG. 1, incident radiation may be projected from a light source onto a first, uncovered end 9 of the banknote 1. The incident light 10 is caused to propagate within the substrate 2 by the light-guiding effect of the opacifying layers 3 and 4, and thus produce a radiation emission 11 at the opposite end 8 of the banknote 1. Alternatively, the radiation emission 11 may be detected at the same end 9, or indeed either side 6 and 7, of the banknote 1, in cases where the material or substance within the substrate 2 causes the incident light to be scattered in various directions within the plane of the substrate. As will be explained below, at least one characteristic of the banknote 1 may be determined by analysing one or more characteristics of the radiation emission 11.

Incident radiation may also be projected onto the side edge of the banknote 1. As seen if FIG. 2, incident radiation 10 is projected onto the uncovered side 6 of the substrate 2 and caused to propagate across the width of the banknote 1 in the substrate 2 by the opacifying coatings 3 and 4 applied to the upper and lower surfaces of the substrate 2. A radiation emission exits the substrate 2 at the opposite side 7.

Figure 3:
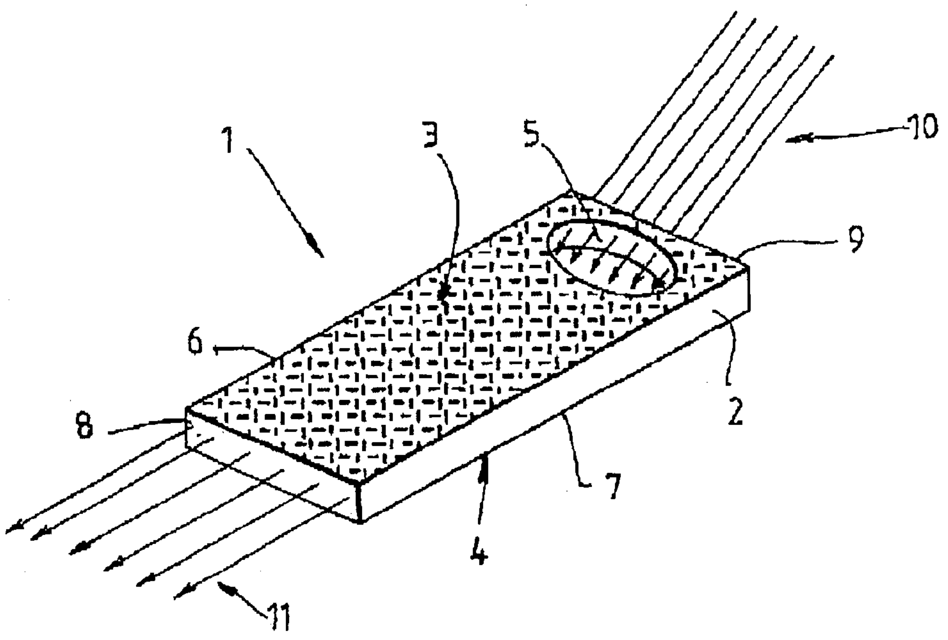
FIG. 3 is a perspective view of the banknote of FIG. 1 having at least one characteristic to be determined according to a third embodiment of the method of the present invention.

Incident radiation may also be projected onto the clear plastic window 5, or other uncovered zone on one of the faces of the security document 1. As seen in FIG. 3, the use of the clear window 5 in this manner can provide for an easier point of entrance for incident radiation 10 to be projected onto the substrate 2 and then propagate there within. The light will then be reflected along the length and width of the banknote 1 and will exit the banknote through the side 6 and 7, and the ends 8 and 9, resulting in a detectable radiation emission 11.

The incident light 10 may be altered as it propagates within the substrate 2 of banknote 1 by a fluorescent, phosphorescent, pearlescent or like material which, upon impingement of incident radiation at a first wavelength, re-emits radiation at a second wavelength.

Figure 4:
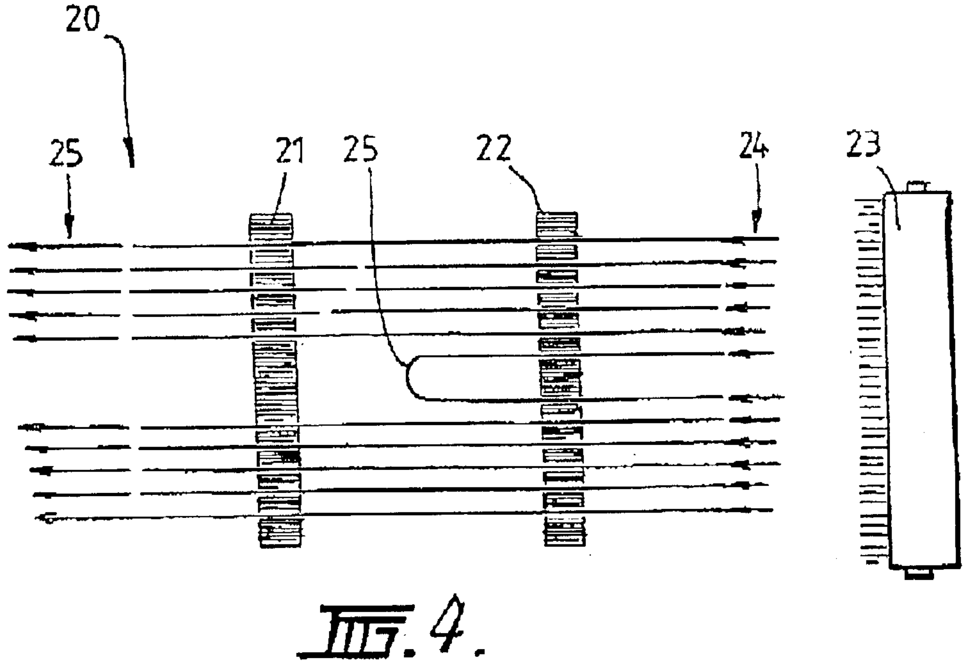
FIG. 4 is a schematic side view of a stack of banknotes having at least one characteristic to be determined according to the method according to the present invention.

Typically, many banknotes are produced together in the form of a sheet, from which the individual banknotes are cut. One or more banknotes may be bundled together into a stack, and bands are then placed around the stack to facilitate its manipulation. FIG. 4 schematically depicts one such stack 20 of banknotes bound together by bands 21 and 22. A light or other radiation source 23 may be used to project incident light on radiation 24 onto one wall of the stack, in this case the wall being formed from the ends of the banknotes in the stack. The incident radiation 24 is caused to propagate through the length of each of the banknotes in the stack 20 by the opacifying coatings onto the surfaces of each banknote. Radiation emissions 25 are accordingly caused to exit the opposing end of each banknote in the stack 20.

Folded corners and edge tears may ordinarily inhibit the entering and exiting of the light or other radiation into and from the plastics substrate 2. Accordingly, it is desirable to position the light source 23 and radiation emission detected towards the centre of the banknote within the stack 20.

It is possible to project radiation onto the substrate of each banknote including a clear window such as that illustrated in FIG. 3, by firstly arranging each of the banknotes in the stack 20 so that the clear windows of all banknotes are superposed, and then project the indicent radiation from the radiation source 23 through the superposed uncovered zones and onto the substrate of each security document in the stack.

Figure 5:
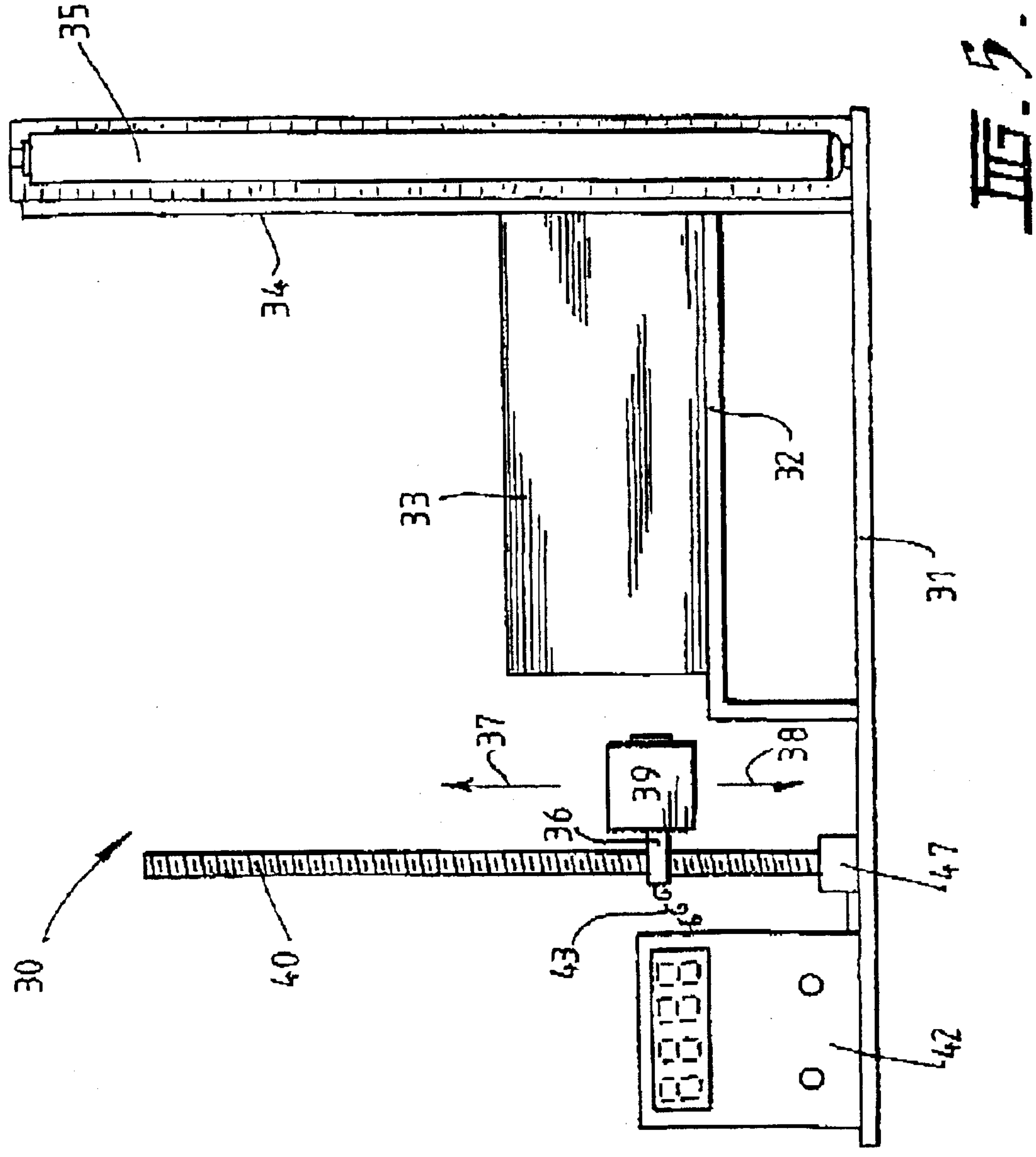
FIG. 5 is a side view of an apparatus for use in determining one or more characteristics of the stack of banknotes of FIG. 4.

FIG. 5 illustrates one embodiment of an apparatus that may be used to perform the method of determining at least one characteristic of one or more security documents according to the present invention. The apparatus 30 shown in this figure includes a base 31 carrying a support surface 32 upon which is placed a stack 33 of banknotes or other security documents having at least one characteristic to be analysed. One edge of the stack of banknotes is placed in contact with a vertically extending reference member 34. The support member includes apertures through which radiation may be projected from a radiation source 35, such as a fluorescent light tube.

A support plate 36 movable in the direction indicated by the arrows 37 and 38 carries an optical reading head 39. Movement of the support plate 36 is produced by a suitable actuator such as a rotary screw 40 driven by a motor 41 driven by a control unit 42. Electrical signals from the optical reading head 39 are applied to the control unit 42 by means of electrical connections 43. The control unit 42 acts to drive the rotatable screw 40 and thus cause the optical reading head to be moved across an edge of the stack 33 which is remote from the edge abutting the vertically extending member 34. The optical reading head 39 is operative to produce an electrical signal as it moves across the edge of the stack 33 corresponding to the incident radiation thereupon. The optical reading head 39 may detect radiation emission from the opposite side of the stack 33 to which radiation is projected onto, as shown in FIG. 5, or from the same or any other side of the stack 33.

The optical reading head 39 may comprise a series of one or more charge coupled devices (CCDs) or other photo responsive devices, extending in a line across part or all of the width of the stack 33 of banknotes. In this way, the optical reading head 39 is able to detect one or more characteristics of the radiation emission 11 from each banknote at one or more locations across the width of each banknote in this stack 33. The control unit 42 acts to digitise the signals received from the optical reading head 39 to enable further processing and analysis of the one or more characteristics of the radiation emission or emissions to be assessed.

Figure 2:
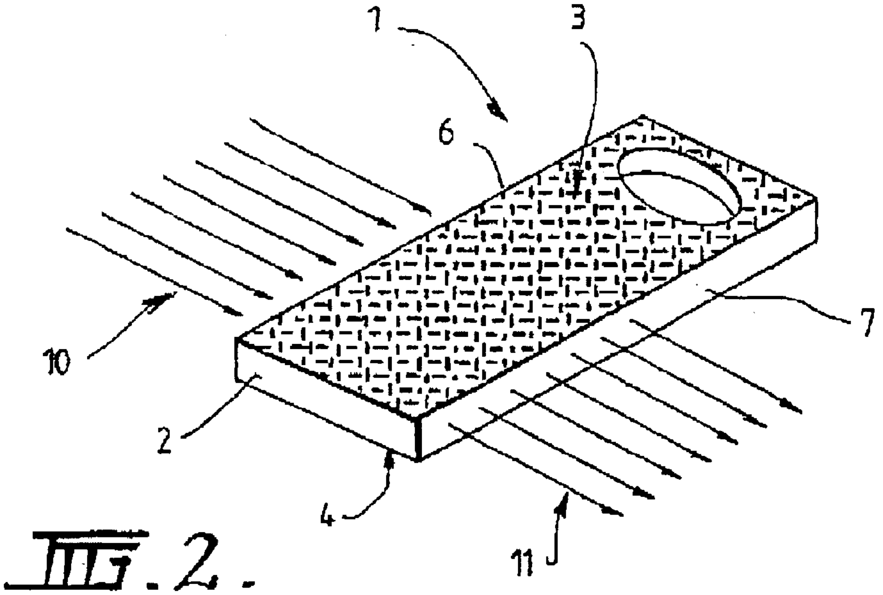
FIG. 2 is a perspective view of the banknote of FIG. 1 having at least one characteristic to be determined according to a second embodiment of the method of the present invention.
Figure 6:
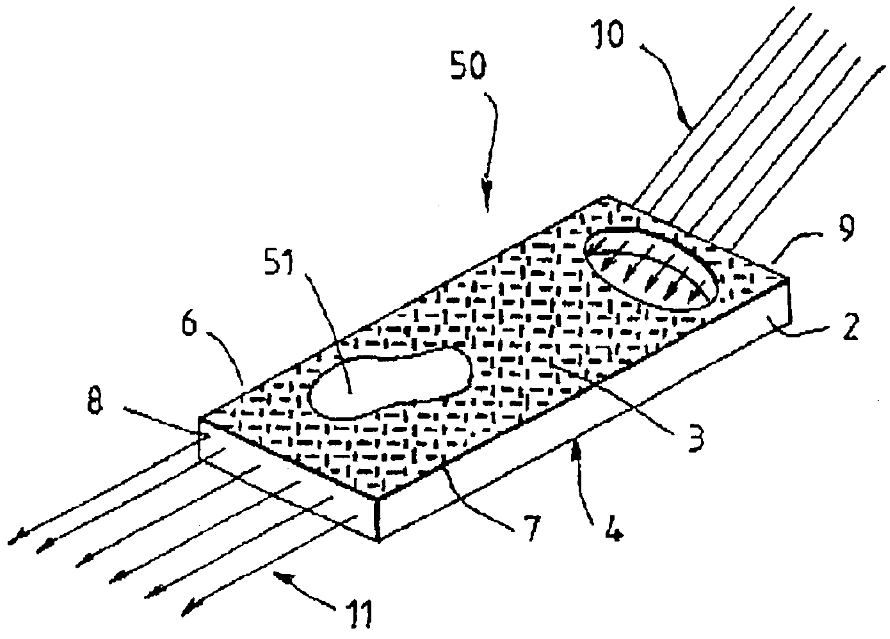
FIG. 6 is a perspective view of a banknote having a worn zone to be detected according to the present invention.

FIG. 6 illustrates an example of a banknote 50 identical to the banknote 1 shown in FIGS. 1 to 3, except for a worn zone 51 formed in the upper opacifying layer 3. It has been observed that the integrity—or uniformity across at least part of a dimension of the banknote—of the radiation emitted from the substrate of the polymer banknote 50 varies indirectly with the amount of wear and tear displayed by the banknote 50. Such wear and tear may result from not only the presence of worn zones, such as that reference 50 in FIG. 6, in one or other of the opacifying layers 3 and 4 applied to the substrate 2, but in addition from faults and irregularities which may develop in the substrate 2 itself from repetitive folding and use. Such worn zones or other irregularities act to locally block at least a portion of the radiation propagating within the substrate 2 from being emitted as part of the radiation emission 11. Alternatively, radiation emissions from the worn zone or zones, if any, of an individual banknote 50 may be used to detect the presence of such worn zones.

Figure 7:
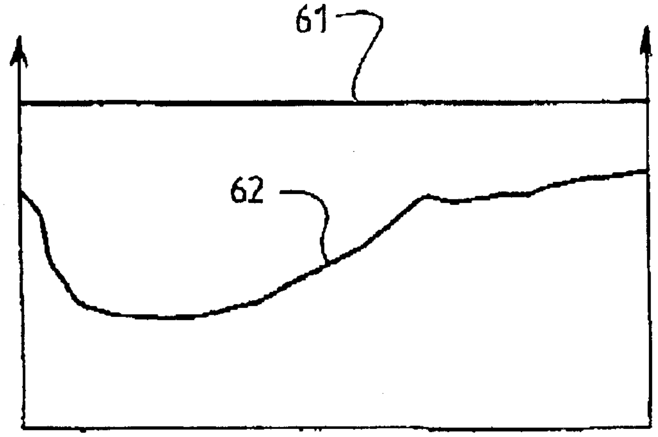
FIG. 7 is a graphical representation of a radiation emission from the side edge of the banknote of FIG. 6.

FIG. 7 illustrates an exemplary graph plotting the intensity of radiation detected by the optical reading head 39 across the width of the end 8 of the banknote 50 between the sides 6 and 7. The plotted line 61 represents the radiation emission profile that would be detected along the edge 8 of the banknote 50 in the case of an ideal (unworn and unused) banknote. The plotted line 62, however, represents the radiation emission profile of the banknote 50 represented in FIG. 6. It will be seen that the intensity of the radiation emission 11 exiting the banknote 50 varies across the width of the end 8 of the banknote 50. In particular, a portion of the radiation propagating within the substrate 2 approximate a worn zone, such as that reference 51, is prone to "leak" from the banknote 50. The intensity of the radiation emission 11 from an area corresponding to the worn zone 51 will be reduced.

Analysis of the digitised values corresponding to the plotted line 62 by the control unit 42 enables a determination of whether the banknote 50 is suitable for future circulation. The control unit 42 may notably act to assess the intensity of the radiation emission detected at any point along the end 8 of the banknote 50. The control unit 42 may additionally or alternatively determine the banknotes suitability for future use by assessing the integrity, or uniformity, of the digitised values corresponding to the plotted signal 62.

Stacks of banknotes including a predetermined number of notes which have been determined to be unfit due to surface wear or other defects may then be removed from circulation by a CVCS machine which includes the apparatus illustrated in FIG. 5.

The banknote 1 shown in FIGS. 1 to 3 may include at least one substance or material that acts to modulate the propagated radiation within the substrate 2 of the banknote 70. Various techniques may be used to achieve this modulation. For example, a fluorescent, phosphorescent, pearlescent or like material that receives light at a certain wavelength and re-emits light at a different wavelength may be used. This re-emittance can be measured by a detector at any edge of the banknote 1.

An optical diffraction or other machine readable effect generated by such a material or substance may be denomination specific, that is to say, a first material or substance producing a first machine readable affect may be included in a first denomination of banknotes, a second material or substance producing a second machine readable affect may be included in banknotes of a second denomination, and so on. In this way, the radiation emission 11 exiting each banknote can be said to bear authenticating information which not only enables the authenticity of the banknote to be verified, but also the verification of the denomination of that banknote.

It will be appreciated that many other variations may be made to the above described components and arrangements without departing from the spirit or ambit of the invention.

For example, whilst the present invention has been in relation to the determination of at least one characteristic of one or more security documents arranged in a stack, the invention is also applicable to the counting of other security documents and sheet-like articles, whether arranged in a stack or individually.

Moreover, the results of the determination of at least one characteristic of the security documents can be used, for example, by a CVCS machine in the destruction of banknotes unsuitable for future use, the sorting of banknotes by denomination, etc.

What is claimed is:

1. A method of determining at least one characteristic of at least one security document, such as a banknote that includes a sheet-like substrate of plastics material and opacifying layers applied to opposing faces of the substrate, the method comprising;

(a) projecting radiation from a radiation source into the substrate of the security document such that the opacifying layers cause the projecting radiation to propagate within the plane of the substrate in a manner that results in radiation emission from the substrate;

(b) detecting the radiation emission from the substrate of the security document; and (c) analysing the detected radiation emission to determine at least one characteristic of the security document.

2. A method according to claim 1, wherein step (c) includes detecting the intensity of the radiation emission from the security document.

3. A method according to claim 1, wherein step (c) includes detecting the integrity of the radiation emission from the security document.

4. A method according to claim 1, wherein step (c) includes detecting the wavelength of the radiation emission from the security document.

5. A method according to claim 1, wherein the substrate includes a substance or material for modulating the propagated radiation within the substrate of the security document so that the radiation emission produces a machine-readable effect, and wherein step (c) includes detecting the machine-readable effect.

6. A method according to claim 5, wherein the radiation emission bears authenticating information, and wherein step (c) includes detecting the authenticating information.

7. A method according to claim 6, wherein each authenticating substance or material is denomination specific.

8. A method according to claim 1, wherein the projected radiation in step (a) is projected onto an edge of the substrate of the security document.

9. A method according to claim 1 or claim 8, wherein the radiation emission is detected in step (b) from an edge of the security document.

10. A method according to claim 9, wherein the edge from which the radiation emission is detected is the same as the edge onto which the projected radiation is projected.

11. A method according to claim 9, wherein the edge from which the radiation emission is detected is different from the edge onto which the projected radiation is projected.

12. A method according to claim 1, wherein the opacifying layers only partially cover at least one of the faces of the substrate to leave an uncovered zone on that face, the projected radiation in step (a) being projected onto the uncovered zone.

13. A method according to claim 1, wherein the substrate includes material which acts to assist in the propagation of the radiation in the substrate.

14. A method according to claim 13, wherein the material includes any one or more inks selected from fluorescent, phosphorescent, pearlescent or like inks.

15. A method according to claim 1, wherein one or more of the opacifying layers are formed from ink.

16. A method according to claim 1, wherein one or more of the opacifying layers are formed from paper.

17. A method according to claim 1, wherein the radiation projected in step (a) includes light selected from visible light, ultraviolet light, radio waves or infrared light.

18. A method according to claim 1, wherein the radiation projected in step (a) forms part of the visible or non-visible light spectrum.

19. A method of determining at least one characteristic of at least one security document, such as a banknote, the security document including a sheet-like substrate of plastics material and opacifying layers applied to opposing faces of the substrate, the method comprising:

(a) projecting radiation from a radiation source into the substrate of the security document for propagation therein, the opacifying layers acting to guide the projection radiation within the substrate;

(b) detecting a radiation emission of the substrate from an edge of the security document, the radiation emission resulting from the propagated radiation; and (c) analysing one or more characteristics of the radiation emission.

20. A method of determining at least one characteristic of a stack of security documents, such as banknotes, each security document of the stack including a sheet-like substrate of plastics material and opacifying layers applied to opposing faces of the substrate, the method comprising:

(a) projecting radiation from a radiation source into the substrate of each security document of the stack for propagation therein, the opacifying layers acting to guide the projecting radiation within the substrate;

(b) detecting radiation emissions from edges of the substrates of the stack of security documents, the radiation emissions resulting from the propagated radiation; and (c) analysing one or more characteristics of the radiation emissions.

* * * * *